SELF-THREADING REEL

Filed Jan. 21, 1966

2 Sheets-Sheet 1

Inventors:
Ernest O. P. Tatter
Norman L. Williams
Philip Vazzano
By Hofgren, Wegner,
Allen, Stellman & McCord Attys United States Patent Office 3,330,496

Patented July 11, 1967

3,330,496

SELF-THREADING REEL

Ernest O. P. Tatter, Addison, Norman L. Williams, Villa Park, and Philip Vazzano, Des Plaines, Ill., assignors to Warwick Electronics Inc., a corporation of Delaware Filed Jan. 21, 1966, Ser. No. 522,229
17 Claims. (Cl. 242—74.2)

ABSTRACT OF THE DISCLOSURE

A reel usable with a tape recorder for automatically gripping and winding magnetic tape upon the reel including an annular spring member spaced concentrically outwardly of the reel hub and including a plurality of radially inwardly directed spring fingers which are spaced sufficiently closely to one another at the reel hub to define effectively circumferentially continuous tape gripping means. The annular spring member includes radially inwardly extending retention fingers between each of the spring fingers, which cooperate with ribs on one of the reel flanges to prevent the spring member from moving circumferentially relative to the reel hub.

This invention relates in general to tape recording apparatus, and more particularly to a reel for winding magnetic tape and having novel means for gripping a leading end of the tape or a suitable leader fixed on the leading end of the tape.

In the tape recording industry there has been a long felt need for a simplified apparatus which would satisfactorily perform all of the functions of prior art devices while being easy to operate so as to appeal to a wide consumer market. One of the most troublesome problems which has been encountered in the use of known devices has been the necessity of manually threading the leading end of the tape from the supply reel past the magnetic head assembly to the take-up reel where the end of the tape is affixed to the take-up reel. The present invention contributes to the solving of this problem by providing a take-up reel construction with gripping means which will automatically grip the leading end of the tape as it is fed into the reel, so that it is not necessary to manually affix the end of the tape to take-up reel. The reel construction of the present invention has particular utility with automatic threading tape recorders, such as shown and described in Tatter et al. application Ser. No. 406,239, entitled "Self Threading Tape Recorder" and assigned to the assignee of the present invention.

In the past it has been proposed to provide a reel for automatically gripping the leading end of magnetic tape with three radially extending spring fingers at equally circumferentially spaced positions around the reel hub. In such a reel, the spring fingers provide a relatively strong spring force, and afford a resistance to deflection of the spring fingers in the range of 15 to 60 grams. This construction has not functioned satisfactorily, in that the relatively wide 120° space between adjacent spring fingers often causes the reel to fail to grip the leading end of the tape until a substantial portion of the tape has been fed into the reel. When the reel does grip the tape, the ungripped end portion of the tape projects outwardly from the reel hub so that when a succeeding convolution is wound upon the hub, the end portion of the tape is bent backwardly upon itself which ultimately causes a kink in the tape. Another drawback of a reel such as that mentioned above is that it operates unsatisfactorily with tape recorders having automatic tape feeding means. More particularly, in such tape recorders the tape gripping take-up reel is usually driven at a constant speed, and means are provided for automatically feeding tape from a supply reel to the take-up reel. The relatively strong spring fingers of the take-up reels as described above quickly and secured grasp the leading end of the tape to suddenly apply lengthwise pull on the tape which causes the tape being supplied from the supply reel to overfeed, often jamming the tape feeding means and preventing further operation thereof. A still further drawback of a reel such as that described above, is that the spring fingers are sufficiently strong to cause deformation of the relatively weak magnetic tape when the same is wound upon the reel. Additionally, such reels do not function satisfactorily with tape having a relatively stiff leader at the outer end thereof, as is often employed in automatic feeding tape recorders. Accordingly, the general purpose of the present invention is to provide an improved reel for automatically gripping the leading end of the tape which possesses none of the disadvantages noted above.

An object of the invention is to provide a tape gripping reel with effectively circumferentially continuous clutch means adjacent the reel hub, so that the opposite edges of the leading end of the tape or tape leader will be gripped as soon as the tape is fed into the reel, thereby obviating the problem of having the succeeding tape convolution fold over the end portion of the tape.

Another object of the invention is to provide a tape gripping reel as described above with relatively weak tape clutching means so that the opposite edges of the leading end of the tape or tape leader will be gradually grasped at a uniform rate to prevent overfeeding of the tape from the supply reel.

A further object of the invention is to provide a tape gripping reel with clutch means as described above, wherein the clutch means is defined by an annular spring member having a plurality of spring fingers positioned closely adjacent to one another, and spaced only by an amount sufficient to prevent the spring member from becoming permanently deformed when the tape is wound upon the reel.

Still another object of the invention is to provide a tape gripping reel with means adjacent the reel hub for positively captivating the leading end of the tape.

A still further object of the invention is to provide a tape gripping reel having an annular spring member surrounding the reel hub with novel means for preventing movement of the spring member relative to the reel.

Another object of the invention is to provide a tape gripping reel as described above with a durable coating on the spring member which enhances the tape gripping ability of the reel.

Yet another object of the invention is to form the tape gripping reel of two assemblable parts, with each of the parts having novel means for properly aligning the parts relative to one another.

A further object of the invention is to provide a tape gripping reel as described above with a uniform tape aligning surface adjacent the hub so that the tape convolutions adjacent the hub will be neatly wound.

Still another object of the invention is to provide a tape gripping reel which will function effectively to grip magnetic tape and leader material for automatic winding of the tape.

These and other advantages of the invention will be more readily apparent from the following detailed description taken in connection with the accompanying drawings, in which.

Figures 1, 2, 3:
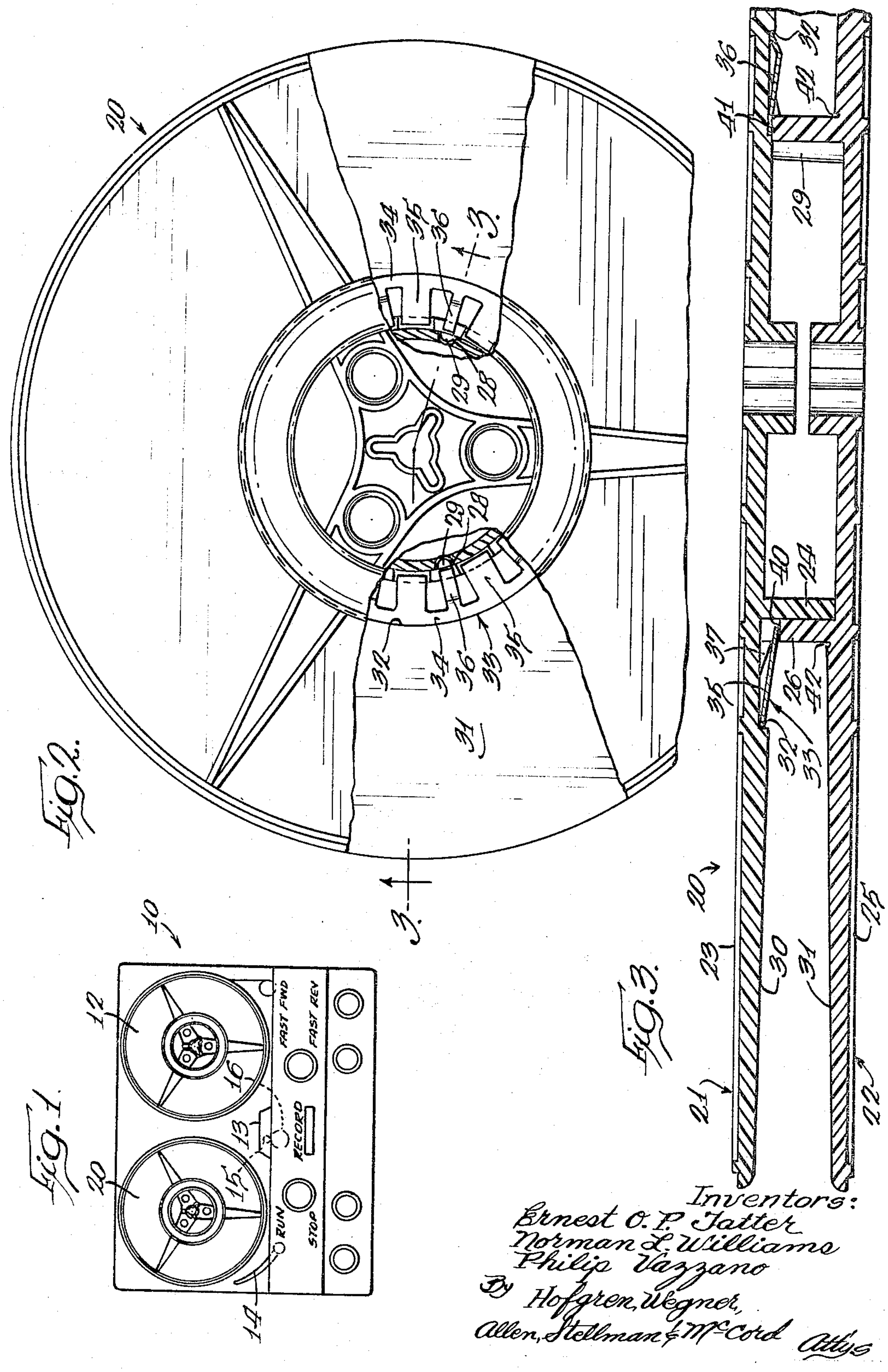
FIG. 1 is a plan view of a tape recorder with which the reel of the present invention is utilized.
FIG. 2 is a fragmentary plan view of a preferred embodiment of the invention, with certain portions being broken away for clarity of illustration.
FIG. 3 is an enlarged sectional view taken generally along line 3—3 of FIG. 2.

While this invention is susceptible of embodiment in many different forms, there is shown in the drawings and will herein be described in detail one specific embodiment with the understanding that the present disclosure is to be considered as an exemplification of the principles of the invention and is not intended to limit the invention to the embodiment illustrated. The scope of the invention will be pointed out in the appended claims.

Referring now to the drawings, wherein like reference characters designate like or corresponding parts, a tape recorder 10 is shown in FIG. 1 having a supply reel 12 and a take-up reel 20. As is well known in the art, the tape being fed from supply reel 12 passes along a tape path past a magnetic head assembly 13 where a capstan 15 and pressure roller 16 cooperate to feed the tape to the take-up reel 20. As is described in the above mentioned application, a guide finger 14 may be provided on the tape recorder 10 for guiding the leading end of the tape into the take-up reel 20.

Figure 5:
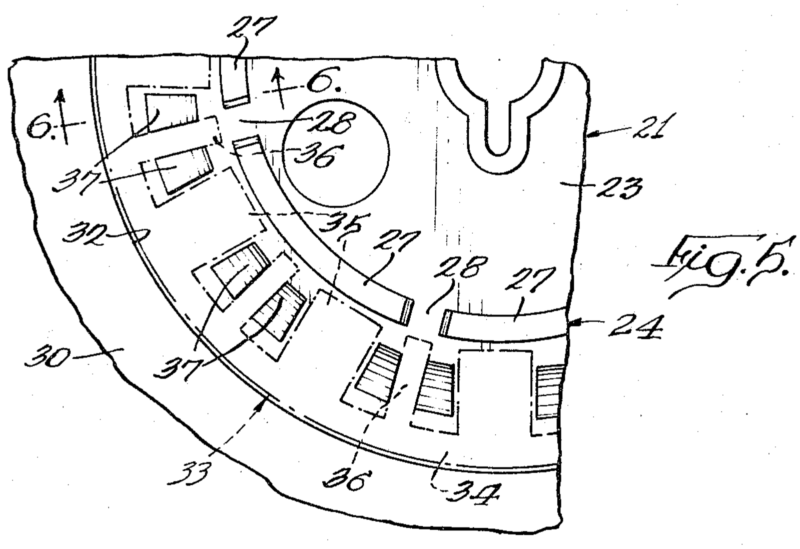
FIG. 5 is a fragmentary plan view of the other of the reel parts with the spring being shown in broken lines.

As can be best seen in FIG. 3, the reel 20 is formed by two parts 21 and 22, and the first part 21 includes a generally circular flange 23 and a generally cylindrical hub portion 24 spaced concentrically of the center of the flange and extending at generally right angles with respect thereto. The second part 22 also includes a generally circular flange 25, and a generally cylindrical hub portion 26 is provided concentrically outwardly of the center of the flange 25 at substantially right angles with respect thereto. As can be seen in FIG. 5, hub portion 24 is formed by a plurality of circumferentially spaced hub section walls 27, which define axial slots or openings 28 therebetween. The hub portion 26 is a circumferentially continuous wall; and a plurality of axially extending ribs or posts 29 are provided on the inner surface of hub portion 26, and are received in slots 28 when the reel parts 21 and 22 are assembled together. Slots 28 and ribs 29 are preferably tapered, to facilitate the insertion of the ribs into the slots, and it will be appreciated that the ribs and slots cooperate to define means for properly aligning the reel parts 21 and 22 with respect to one another. Any suitable means, such as welding, adhesives or the like, may be utilized to secure the reel parts 21 and 22 to one another.

As can be seen in FIG. 3, the facing surfaces 30 and 31 of flanges 23 and 25 respectively, converge toward one another from a relatively wide span adjacent the outer periphery of the flanges to a relatively narrow span adjacent the reel hub. An annular recess 32 is provided in flange surface 30 radially outwardly of the reel hub, and clutch means in the form of an annular spring member 33 is positioned in the recess 32.

Spring member 33 includes a circumferentially continuous outer web 34 adjacent the outer edge of the recess 32, and a plurality of closely adjacent spring fingers 35 extend generally radially inwardly from the web 34. Spring member 33 also includes a plurality of radially inwardly extending retention fingers 36 which are positioned between adjacent spring fingers 35. The spring fingers 35 are positioned sufficiently closely to one another to define, in combination with the portion of surface 31 adjacent the reel hub, an effectively circumferentially continuous clutch means which will effectively grip the opposite edges of the leading end of the tape or tape leader without fail, but it will be understood that it is necessary that some spacing be provided between the fingers to avoid the so-called "oil can" effect which would result in permanent deformation of the spring by the tape being wound upon the reel.

Means are provided on flange 23 in recess 32 for preventing circumferential movement of the spring member 33 relative to the reel hub. This movement prevention means includes a plurality of pairs of spaced ribs 37, and the retention fingers 36 are each received between a pair of the ribs 37 so that the ribs define abutments which prevent circumferential movement of the spring member 33 relative to the reel hub. As is clear from FIGS. 5 and 6, the ribs 37 are spaced from the reel hub, and an annular channel 38 is defined therebetween. As will hereinafter be explained in more detail, means on the hub portion 26 of reel part 21 are received in the channel 38 to engage the retention fingers 36.

Figure 4:
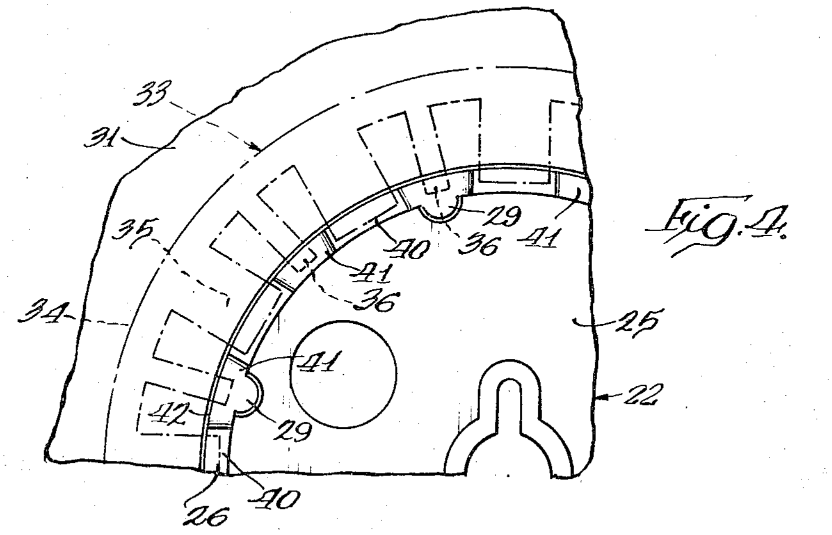
FIG. 4 is a fragmentary plan view of a portion of one of the reel parts with the spring member being shown in broken lines.

The hub portion 26 of reel part 22 includes a plurality of circumferentially spaced notches 40 about the upper edge thereof (as viewed in FIGS. 3 and 4), which define a plurality of circumferentially spaced axially projecting extension members 41 therebetween. The extension members 41 are received in the channel 38 when the reel parts 21 and 22 are assembled together, and bear against the end portions of the retention fingers 36 to positively hold the spring member 33 against the reel part 21. The end portions of the spring fingers 35 are received in the notches 40, so that the notches 40 in effect define means allowing the spring fingers 35 to be deflected relative to the reel structure upon engagement with the tape being fed thereto.

In an exemplary embodiment of the invention, which is used in the feeding and winding of ¼" magnetic tape, the flange surfaces 30 and 31 are spaced from one another adjacent the outer periphery of the reel by .375" to provide a relatively wide mouth for receiving the leading end of the tape, and to allow the guide finger 14 to freely move inwardly of the reel between the reel flanges. The surfaces 30 and 31 converge toward one another at an angle of approximately 3½° to gradually guide the leading end of the tape toward the reel hub, but the surfaces at all times remain spaced from one another by a distance at least equal to the average tape width. The distance between the bottom of notches 40 and the portion of surface 31 adjacent the hub is .212", so that the end portions of the spring fingers 35 adjacent the hub will interfere with the ¼" magnetic tape being wound thereabout by approximately .038".

Figure 6:
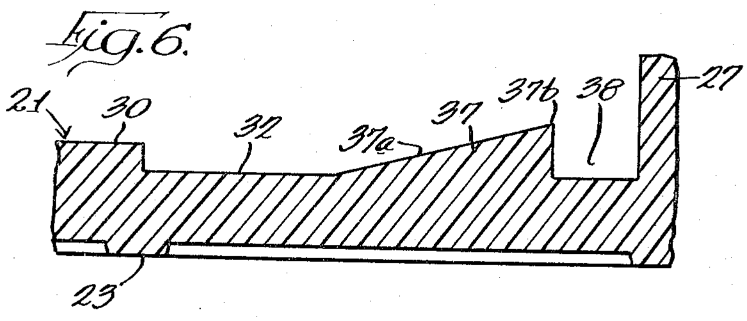
FIG. 6 is an enlarged sectional view taken generally along line 6—6 of FIG. 5.

As is best seen in FIG. 6, ribs 37 begin approximately midway of the recess 32, and include an upper surface **37*a* which is inclined uniformly outwardly from the recess 32 and which terminates at a point 37*b* which is spaced from the portion of surface 31 adjacent the reel hub by approximately .250". Thus, the distance between the innermost portion of the ribs 37 and the surface 31 is approximately the width of the tape being wound upon the reel. Ribs 37 serve to limit the amount of deflection of spring 35 to insure that the force applied by the spring fingers to the magnetic tape will be low enough so as not to deform the tape. In this respect, the spring fingers 35 each afford a resistance to deflection in the range of 12 to 15 grams. It will be appreciated that the force of spring fingers 35 will tend to increase as the spring fingers are deflected by the tape, however, the ribs 37 limit the deflection of the spring fingers to a range where the force applied thereby to the tape is not excessive. Applicants have found that the above mentioned spring force range allows the reel to function satisfactorily in gripping tape with or without a tape leader. Suitable tape leader materials are usually substantially stiffer and somewhat thicker than ordinary magnetic tape, but applicants have found that the spring fingers 35 of the present invention will function satisfactorily to grip magnetic tape and tape leaders. References in the specification and claims to the "gripping of tape" are to be construed as referring to the gripping of tape leaders as well as the tape itself. Spring member 33 is preferably formed from a suitable spring material such as cold rolled phosphor bronze having a thickness of .004". The uniform inclination of rib surfaces 37***a* provides an additional important function in that the surfaces 37*a* cooperate to define a uniform area upon which the inner convolutions of the tape are seated so that the innermost portion of the tape will be neatly wound.

Thus, when the leading end of the tape is fed from the supply reel 12 into the take-up reel 20 and guided between the reel flanges 23 and 25 by the guide finger 14, the spring fingers 35 will immediately lightly grasp the end of the tape or tape leader with a pull which is applied at a uniform rate, and the tape will begin to wind about the reel. The immediate gripping of the tape or tape leader obviates the problem of folding back the end portion of the tape, and the gradual application of the gripping force prevents the tape from being yanked off of the supply reel. The spring fingers 35 are preferably provided with a durable coating to enhance the tape gripping ability thereof. Applicants have found that the clear enamel urethane paint available from Bradley-Vroonan Company under catalogue No. A32567 has provided an exceptionally durable coating which surprisingly markedly improves the tape gripping ability of the spring member by increasing the coefficient of friction between the spring member ande the tape. The spring fingers 35 are spaced sufficiently closely to one another so as to effectively define a circumferentially continuous means for grasping the leading end of the tape, and in the exemplary embodiment of the invention the spring fingers 35 occupy approximately 43% of the inner circumference of the spring member. In the exemplary embodiment of the invention the outer diameter of the spring member 33 is 2.937", the inner diameter of the spring fingers 35 is 2.175", and the inner diameter of the retention fingers 36 is 2.131". The spring fingers 35 are typically .250" wide and the retention fingers 36 are typically .093" wide. The web 34 and the spring fingers 35 are at the same inclination of approximately 14°, and thus the web in effect forms part of the spring fingers have a radial extent .381". The actual length of the spring fingers 35 is approximately .393".

An annular groove 42 is provided in the surface 31 of reel part 22 immediately adjacent the hub portion 26, and groove 42 serves to captivate the leading end of the tape when it is gripped by the reel. Groove 42 preferably has a width of approximately .015" so as to be able to receive several convolutions of the tape therein. As the tape begins to wind upon the take-up reel 20, the spring fingers 35 will be deflected by the tape the amount determined by the ribs 37, and will urge the first few convolutions into the groove 42. The succeeding convolutions will rest upon the inclined surfaces 37*a* of the ribs 37, so that the uniform wrapping of the tape will be effected.

From the foregoing, it will be apparent that each of the objects of the invention has been fully achieved.

We claim:

1. A take-up reel for use with a tape recorder including a tape supply reel, and means for feeding tape from said supply reel to said take-up reel, comprising: a generally cylindrical hub; a pair of axially spaced generally planar circular flanges positioned generally concentrically at opposite ends of said hub; an effectively circumferentially continuous clutch surrounding said hub adjacent one flange for gripping the leading end of a length of tape, said clutch comprising an annular spring member positioned generally concentrically outwardly of said hub, said member being defined by a circumferentially continuous web of spring material having a plurality of closely adjacent spring fingers formed integrally therewith and extending generally radially inwardly thereof, said spring fingers each having an end portion adjacent said hub spaced from said one flange and cooperating with the portion of said other flange adjacent said hub to grip the opposite edges of the leading end of said tape, the force of said spring fingers being sufficiently small so as to gradually apply a gripping force to said tape at a uniform rate, so that said tape is automatically wound around the take-up reel hub without overfeeding of the tape being supplied from said supply reel by rotation of said take-up reel; and means for preventing movement of said spring member circumferentially relative to said hub.

2. A take-up reel as defined in claim 1 wherein said spring fingers are coated with urethane paint.

3. A take-up reel as defined in claim 2 wherein said movement prevention means includes at least one stop member on said one flange and an abutment on said spring member engaging said at least one stop member.

4. A take-up reel as defined in claim 1 wherein the end portions of said spring fingers adjacent the hub are at least as wide as the finger portions adjacent the web.

5. A take-up reel for use with a tape recorder including a tape supply reel, and means for feeding tape from said supply reel to said take-up reel, comprising: a generally cylindrical hub; a pair of axially spaced generally planar circular flanges positioned generally concentrically at opposite ends of said hub; an effectively circumferentially continuous clutch surrounding said hub adjacent one flange for gripping the leading end of a length of tape, said clutch comprising an annular spring member positioned generally concentrically outwardly of said hub, said member being defined by a circumferentially continuous web of spring material having a plurality of closely adjacent spring fingers formed integrally therewith and extending generally radially inwardly thereof, said spring fingers each having an end portion adjacent said hub spaced from said one flange and cooperating with the portion of said other flange adjacent said hub to grip the opposite edges of the leading end of said tape, the force of said spring fingers being sufficiently small so as to gradually apply a gripping force to said tape at a uniform rate, so that said tape is automatically wound around the take-up reel hub without overfeeding of the tape being supplied from said supply reel by rotation of said take-up reel; and a groove in said other flange adjacent said hub for captivating the end of said tape.

6. A tape reel as defined in claim 5 wherein said groove is wide enough to receive several tape convolutions therein.

7. A take-up reel for use with a tape recorder including a tape supply reel, and means for feeding tape from said supply reel to said take-up reel, comprising: a generally cylindrical hub; a pair of axially spaced generally planar circular flanges positioned generally concentrically at opposite ends of said hub; an effectively circumferentially continuous clutch surrounding said hub adjacent one flange for gripping the leading end of a length of tape, said clutch comprising an annular spring member positioned generally concentrically outwardly of said hub, said member being defined by a circumferentially continuous web of spring material having a plurality of closely adjacent spring fingers formed integrally therewith and extending generally radially inwardly thereof, said spring fingers each having an end portion adjacent said hub spaced from said one flange and cooperating with the portion of said other flange adjacent said hub to grip the opposite edges of the leading end of said tape, the force of said spring fingers being sufficiently small so as to gradually apply a gripping force to said tape at a uniform rate, so that said tape is automatically wound around the take-up reel hub without overfeeding of the tape being supplied from said supply reel by rotation of said take-up reel, said one flange including circumferentially spaced pairs of spaced ribs; and means for preventing movement of said spring member circumferentially relative to said hub including a plurality of retention fingers on said spring each positioned between an adjacent pair of spring fingers and each extending inwardly of said web to be received between a pair of ribs.

8. A take-up reel as defined in claim 7 wherein said ribs each include a tape alignment surface inclined with respect to the plane of said one flange.

9. A take-up reel as defined in claim 7 wherein said one flange includes a hub portion concentrically outwardly of the center thereof and positioned at generally right angles with respect to the plane thereof, said ribs being spaced outwardly of said hub portion to define an annular channel therebetween, the end portions of said retention fingers extending into said channel, said other flange having a hub portion spaced concentrically outwardly of the center thereof and positioned at generally right angles with respect to the plane thereof, the hub portion on said other flange surrounding the hub portion on said one flange and having a portion thereof received in said channel and holding said retention fingers against said one flange.

10. A take-up reel as defined in claim 9 wherein one of said hub portions is circumferentially continuous and includes a plurality of spaced axially extending locating ribs therearound, and the other of said hub portions is defined by a plurality of circumferentially spaced hub sections defining slots therebetween, each of said slots receiving one of said ribs therein.

11. A take-up reel as defined in claim 10 wherein said one hub portion is on said other flange and said other hub portion is on said one flange.

12. A take-up reel as defined in claim 9 wherein an annular recess is provided in said one flange outwardly of said hub, said ribs being provided in said recess, and said spring member being seated within said recess.

13. A take-up reel as defined in claim 12 wherein the facing surfaces of said flanges are spaced from one another at their outer edges by a distance substantially greater than the width of the tape, and at least a portion of the facing surfaces converge toward one another, the distance between the portion of said one flange adjacent the outer edge of said recess and the corresponding portion on the other flange being greater than the width of said tape, the outer portions of said spring fingers being spaced from the other flange by a distance less than the width of said tape.

14. A take-up reel as defined in claim 13 wherein said spring fingers are inclined outwardly from said recess.

15. A take-up reel as defined in claim 14 wherein said web is inclined at substantially the same angle as said spring fingers, and the outer portions of said retention fingers are inclined toward said one flange.

16. A take-up reel as defined in claim 15 wherein the portions of said ribs adjacent said hub are spaced from said other flange by a distance substantially equal to the width of the tape.

17. A take-up reel as defined in claim 16 wherein notches are provided in the said hub portion of said other flange for reception of the outer end portions of said spring fingers.

References Cited

UNITED STATES PATENTS

| | | | |
|---|---|---|---|
| 1,861,891 | 6/1932 | Wittel | 242—742 |
| 3,208,688 | 9/1965 | Hanes | 242—742 |

FRANK J. COHEN, *Primary Examiner.*

L. N. MINTZ, *Assistant Examiner.*